United States Patent [19]

Everhart et al.

[11] Patent Number: 5,814,788
[45] Date of Patent: Sep. 29, 1998

[54] METHOD AND APPARATUS FOR ELECTRONIC CONTROL OF THE OUTPUT OF AN ENGINE DRIVEN, CHOPPED DC WELDING POWER SUPPLY, DRIVEN BY AN AC GENERATOR

[75] Inventors: Donald A. Everhart, Fond du Lac; Neal E. Roebke, Appleton, both of Wis.

[73] Assignee: Illinois Tool Works Inc., Glenview, Ill.

[21] Appl. No.: 527,958

[22] Filed: Sep. 14, 1995

[51] Int. Cl.$^6$ ................................................. B23K 9/073
[52] U.S. Cl. ............... 219/133; 219/130.33; 219/137 PS
[58] Field of Search .............................. 219/130.33, 133, 219/134, 137 PS

[56] References Cited

U.S. PATENT DOCUMENTS

| | | | |
|---|---|---|---|
| 2,458,658 | 1/1949 | Tyrner | 219/130.33 |
| 3,912,980 | 10/1975 | Crump et al. | 219/130.33 |
| 3,928,746 | 12/1975 | Ericsson | 219/130.33 |
| 3,961,154 | 6/1976 | Ericsson | 219/130.33 |
| 4,247,752 | 1/1981 | Stringer | 219/130.33 |
| 4,314,195 | 2/1982 | Muter . | |
| 4,465,920 | 8/1984 | Hoyt, Jr. et al. . | |
| 5,166,567 | 11/1992 | Kneisley et al. . | |
| 5,355,075 | 10/1994 | Wilson, III . | |
| 5,408,067 | 4/1995 | Crouse . | |
| 5,444,514 | 8/1995 | Crouse et al. . | |

FOREIGN PATENT DOCUMENTS

| | | |
|---|---|---|
| 2565517 | 6/1985 | France . |
| 2162704 | 6/1985 | United Kingdom . |
| WO 81/10261 | 5/1981 | WIPO . |

Primary Examiner—Clifford C. Shaw
Attorney, Agent, or Firm—George R. Corrigan

[57] ABSTRACT

An engine driven welding power supply is disclosed. The power supply produces a welding output having a plurality of volt-ampere curves. Each of the curves is associated with a selected current output and includes a slope over usable welding range. The magnitude of the slope over the usable welding range is dependent on the selected current output, particularly at a middle range of output currents. The power supply includes a AC generator that provides an AC signal. A rectifier rectifies the AC signals and provides a DC output. The DC output is provided to an output inductor that provides a smooth DC output. The V-A curves are produced by phase control in the rectifier.

14 Claims, 7 Drawing Sheets

METHOD AND APPARATUS FOR ELECTRONIC CONTROL OF THE OUTPUT OF AN ENGINE DRIVEN, CHOPPED DC WELDING POWER SUPPLY, DRIVEN BY AN AC GENERATOR

FIELD OF THE INVENTION

The present invention is generally directed to the control of an AC generator driven, chopped DC welding power supply, and more particularly directed toward a method and apparatus for electronically controlling the volt-ampere (V-A) output characteristics of such a welding power supply.

BACKGROUND OF THE INVENTION

Engine driven welding power supplies may include either a DC generator or an AC generator. Some prior art AC engine driven welding power supplies include, in addition to an engine and an alternator, a reactor followed by a phase controlled rectifier and an output inductor. The output of the alternator is an AC signal (often single phase), and is provided to a reactor that includes a number of different taps and associated range switches. The output of the reactor is typically provided to a SCR bridge, which produces a chopped DC signal. The chopped DC signal is provided to an output inductor that smooths the signal and provides the welding output.

Such an AC engine driven welding power supply is, often, a constant current type machine and the output volt-ampere characteristic has a very steep slope. That is, the output current is nearly constant over a varying range of output voltage. Thus, welding power supplies that are driven by an AC reactor generator are particularly suited for welding applications requiring an approximately constant current output (such as flat plate welding). However, to significantly change the current output, different taps on the reactor must be provided (and selected by the user). This is both costly and inconvenient. Thus, it is desirable to provide an engine driven AC generator that provides a chopped DC output, but does not need a reactor and range switches.

Additionally, the "stiffness" of constant current power supplies has disadvantages for many stick welding applications. For example, when welding vertical cracks, the welder often whips the electrode along the crack as the puddle heats. As the stick moves along the groove the arc length increases and thus the voltage increases. Because the current remains nearly constant, the power also increases. This is undesirable and may result in a burning of the crack. Alternatively, if the voltage decreases too quickly, undesirable arc outages can occur. Thus, it is desirable to provide an engine driven AC generator that provides a chopped DC output that provides a decrease in the heat output as the voltage increases. However, the decrease should not be so abrupt and significant that arc outages occur. Accordingly an output V-A curve having an appropriate slope is desirable.

Some prior art welding power supplies provide a "foot" or "dig" at low voltages. The foot is a portion of the output V-A curve that provides an increased slope (greater current drop as the voltage increases) than other portions of the V-A output curve. The foot is useful for some welding applications, however it would be useful to provide a foot with a slope that is variable and/or user selectable. Accordingly, it is desirable to provide an engine driven AC generator having a chopped DC output that has V-A output curves, each having a foot with a slope that may be selected by the user.

Additionally, a generator driven welding power supply having output V-A curves with multiple breakpoints or multiple slopes is thus desirable. The multiple breakpoints enable the implementation of a foot and a region having a slope that prevents excess heating when the arc length increases while operating in the welding range.

The desirable output V-A curves described above would be preferably provided by a power supply that controls the output of the supply. Such a control could utilize the existing SCR bridge, and minimize the necessity for additional control components.

SUMMARY OF THE PRESENT INVENTION

One aspect of the invention is an engine driven welding power supply that produces a welding output having a plurality of volt-ampere curves. Each of the curves is associated with a selected current output and includes a slope over a usable welding range, and the magnitude of the slope is dependent on the selected current output. The power supply includes an AC generator that provides an AC signal and a rectifier that receives the AC signal and provides a chopped DC signal. The chopped DC signal is provided to an output inductor that provides a smoothed DC output. The V-A curves are produced by phase controlling the rectifier.

In one embodiment the rectifier includes a bridge comprised of at least four switches, that may be SCRs. In another embodiment the bridge is controlled such that each V-A curve has at least two breakpoints.

A second aspect of the invention is a method of supplying a welding output having a plurality of volt-ampere curves. Each curve is associated with a selected current output, and a slope over a usable welding range for each curve is controlled in response to the selected current output. The method includes the steps of generating an AC signal and rectifying the AC signal. The rectified AC signal is chopped and smoothed to provide a DC output.

In yet another embodiment the rectifier is performed by a bridge comprised of at least four switches, that may be SCRs. The bridge may be controlled such that each V-A curve has at least two breakpoints.

Other principal features and advantages of the invention will become apparent to those skilled in the art upon review of the following drawings, the detailed description, and the appended claims.

Before explaining at least one embodiment of the invention in detail, it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF A PREFERRED EXEMPLARY EMBODIMENT

The present invention is directed toward a generator driven welding power supply, such as one used for stick welding, or other DC welding applications. The invention includes an AC generator that provides an AC output. The AC output is chopped and smoothed to provide a DC output. The chopping is performed using a controllable rectifier, and the control is such that the shape of the V-A output curves may be manipulated. Specifically, the output V-A curves have a slope over a usable welding range that is dependent on the user selected output current.

Figure 1:
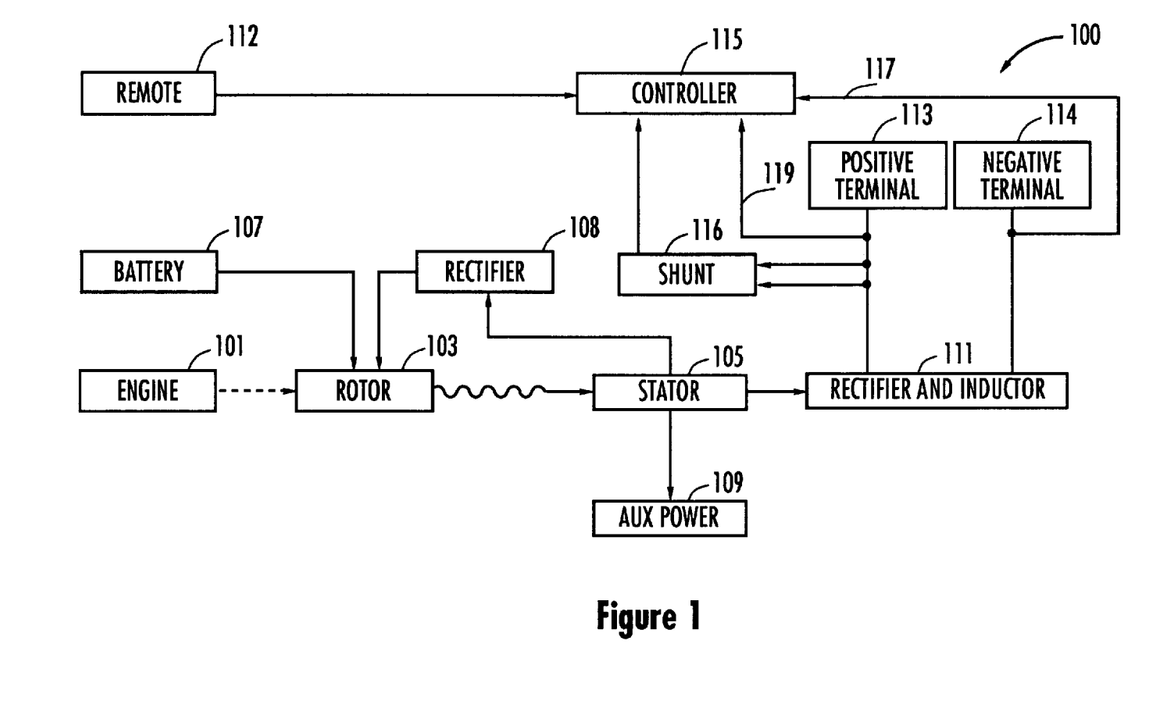
FIG. 1 is a block diagram of an engine driven DC power supply, including an AC generator, made in accordance with the present invention.

Referring now to FIG. 1, a block diagram of a welding power supply 100 made in accordance with the present invention includes, generally, an engine 101, a rotor 103, a stator 105, a rectifier and inductor 111 and a controller 115.

Engine 101 is mechanically linked (shown by the dashed line) to rotor 103. In the preferred embodiment the generator is single phase (although other embodiments are contemplated) and rotor 103 includes a single field coil that is caused to revolve by engine 101. The initial field is provided by, in the preferred embodiment, a battery 107.

Rotor 103 is magnetically coupled to stator 105, shown by the curved line on FIG. 1. Stator 105 includes an exciter winding, a welding output winding, and an auxiliary power winding. The exciter winding provides an output to a rectifier 108, which provides field current to rotor 103.

The auxiliary output winding of stator 105 provides approximately 110 volt power to auxiliary power output 109 for auxiliary equipment such as power tools or lights. Such equipment is generally designed to operate on a constant voltage, Accordingly, in one embodiment the generator (which includes rotor 103 and stator 105) may be selected to provide a constant voltage output. If such a generator is used, the output curves for the welding output may be shaped using controller 115, as will be described below in more detail.

As stated above, stator 105 includes a welding output winding. The welding output winding is connected to rectifier/inductor 111. Rectifier/inductor 111 includes, in the preferred embodiment, a two SCR bridge with two diodes, and an inductor in the common leg. Alternatively, a four SCR bridge may be used, also with a common inductor. In another alternative embodiment a two SCR bridge, with a center tapped inductor may be used. An example of the four SCR bridge may be seen in U.S. Pat. No. 4,038,515, which is incorporated herein by reference. In accordance with the present invention the bridge is operated in a DC mode. Such bridges, both two SCR and four SCR, are now well known in the art.

The output of rectifier/inductor 111 is provided to positive terminal 113, and negative terminal 114. When welding positive terminal 113 is typically connected to the electrode, and negative terminal 114 is typically connected to the workpiece.

The SCRs in rectifier/inductor 111 are phase controlled by controller 115. As is well known in the art, the phase at which the SCRs are turned on controls the amount of power delivered to terminals 113 and 114. Controller 115 receives four inputs which are used to determine the phase at which the SCRs in rectifier/inductor 111 are turned on. A command signal, indicative of the desired current is provided. In the preferred embodiment the command signal is provided from remote control 112, and is user selected. The control also receives a current feedback signal from a shunt 116. In alternative embodiments the current feedback signal may be derived from a current tap. A voltage feedback signal is provided on lines 116 and 117. A dig error input may also be provided to current regulator 209.

In response to these inputs controller 115 determines the firing angle of the bridge SCRs. More specifically, controller 115, controls the output V-A curves to have a slope over a usable range that is dependent on the current selected. At lower currents a steep slope (i.e., the current change is small for a given voltage change) is provided. This helps prevent outages that might otherwise occur as the welder moves the stick away from the workpiece.

At higher selected currents a less steep slope (i.e., the current change is greater for a given voltage change) is provided. This helps to reduce the power increase that occurs as the arc voltage increases. In one embodiment a delay is provided, so that when the voltage initially changes, the current remains constant for a short period of time. Following the delay the current adjusts to the new position on the V-A curve. Additionally, a foot or dig may be provided at lower voltages. The foot or dig has a higher slope than the portion of the curve above the dig.

Figure 7:
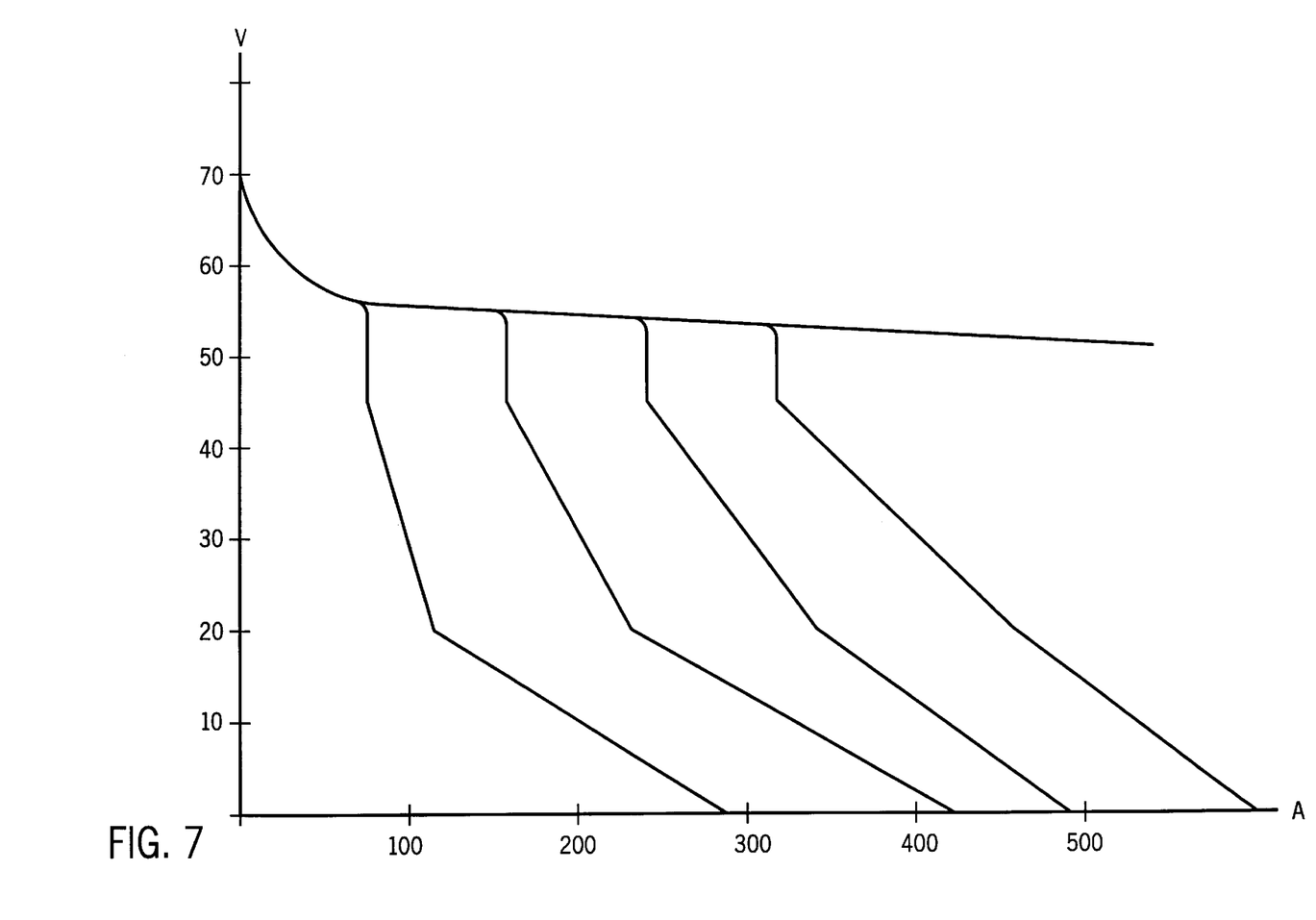
FIG. 7 is a graph showing V-A output curves in accordance with the present invention.

For example, in one preferred embodiment the output V-A curves have a nearly vertical portion above 45 volts. From about 45 to 20 volts the slope is selected to provide a desirable welding output, and varies with the selected current. Below 20 volts a dig is provided, and the slope is greater (less steep) than the slope from 20–45 volts. The slope of the dig may be varied in response to a user selected (or machine limited) maximum current output. A graph of such V-A curves is shown in FIG. 7.

Figure 2:
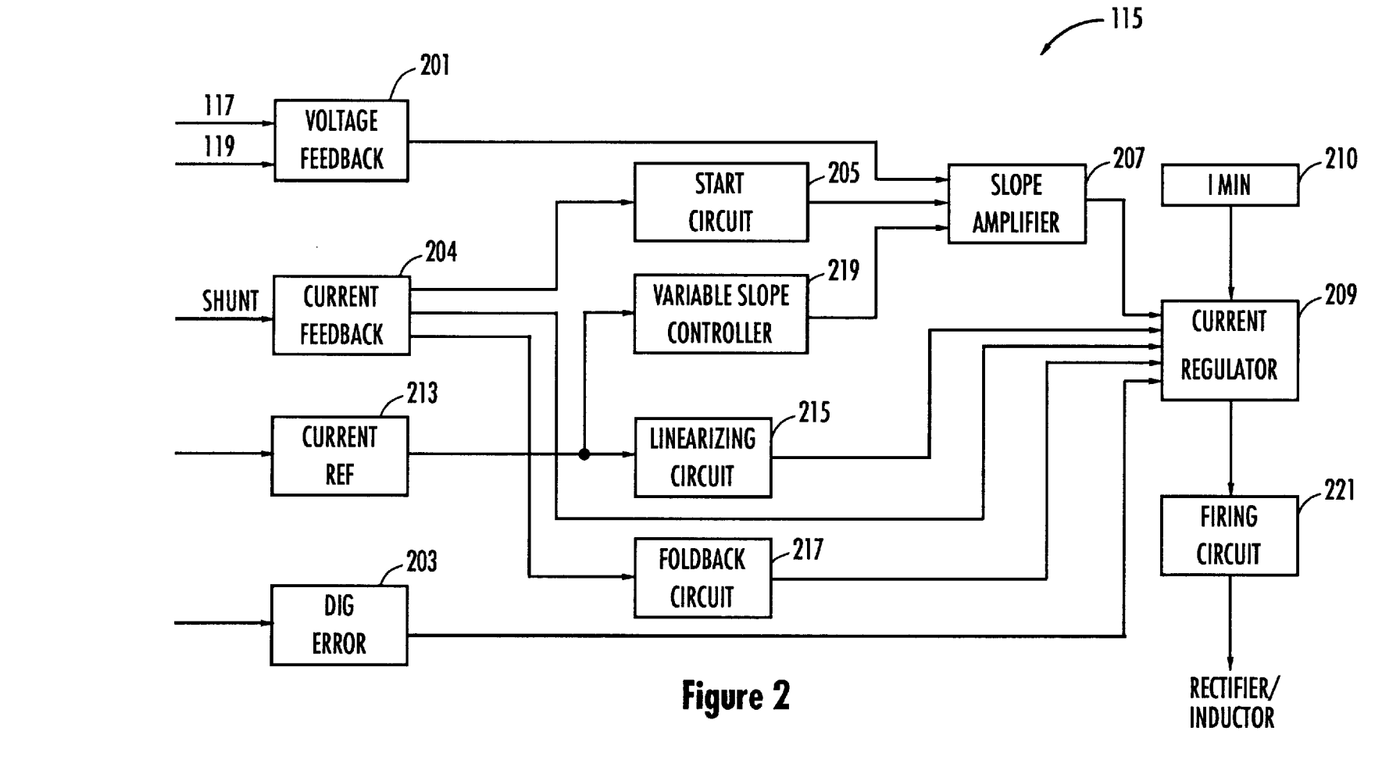
FIG. 2 is a block diagram of the controller shown generally in FIG. 1.

Referring now to FIG. 2, a block diagram of controller 115 shows a voltage feedback circuit 201, a dig error circuit 203, a current feedback circuit 204, a start circuit 205, a slope amplifier 207, a current regulator 209, an IMIN circuit 210, a current reference circuit 213, a linearizing circuit 215, a variable slope controller 219, and a firing circuit 221.

Generally speaking, firing circuit 221 is a standard firing circuit, such as those well known in the art. Firing circuit 221 receives a signal from current regulator 209, that causes firing circuit 221 to provide a pulse of power to turn on an SCR (or other switch) at the appropriate phase to obtain a desired current output. Where necessary, these circuits will be described in detail after the general description of controller 115 provided immediately hereafter.

Current regulator 209 (described in detail below) receives inputs from IMIN circuit 210, slope amplifier 207, linearizing circuit 215, dig error circuit 203, and foldback circuit 217. Slope amplifier 207 determines the slope of the output V-A curve. In one preferred embodiment a slope of about 1 volts per 3 amps (i.e., an increase in voltage of 1 volt causes a decrease in the current of about 3 amps) is provided when the selected current output is above about 100 amps. The slope decreases (i.e., a lesser change in the current) as the selected current decreases. This slope is exemplary, and may be tailored to the application.

Linearizing circuit 215 is provided to linearize the selected current signal (current reference) it receives from current reference circuit 213. The current reference signal is dependent upon the position of a potentiometer on the front panel of the machine, that is adjusted by the user depending on the desired current. Without linearizing circuit 215, the output would vary from 0 amps to 80 amps over about a five degree rotation of the potentiometer. Linearizing circuit 215 provides that current range to take place over about a 25–30 degree rotation of the potentiometer.

IMIN circuit 210 provides an output to current regulator 209 that sets the minimum selectable current for the machine. The minimum selectable current in the preferred embodiment is on the order of 20 amps.

Foldback circuit 217 provides an input to controller 209 that prevents high current for an extended period of time. This helps to prevent the burning out of rotor 103 or stator 105. Foldback circuit 217 receives an input from current feedback circuit 204, indicative of the output current. Based upon the magnitude of the output current, and the length of time the current output has been dangerously high, foldback signal 217 can signal current regulator 209 to decrease the current output.

Slope amplifier 207 provides a signal that allows current regulator to create V-A curves that vary with the selected current. As stated above, the current change for a unit voltage change is greater for higher currents, and lesser for lower currents.

A current feedback signal is provided from current feedback circuit 204 to current regulator 209. The current feedback signal, along with the other inputs to current regulator 209, described above, allow current regulator 209 to shape the output V-A curves in the desired manner.

Slope amplifier 207 receives as inputs signals from voltage feedback 201, start circuit 205, and variable slope controller 219. The voltage feedback signal is generally used to determine when the slope will be controlled. As stated above, in the preferred embodiment the output V-A curves are vertical until approximately 45 volts. Below 45 volts a slope dependent on the selected output current is provided. Slope amplifier 207 uses the voltage feedback signal to determine if the output is in the range at which the slope should be adjusted (i.e., above or below 45 volts).

The signal from start circuit 205 is provided to slope amplifier 207 to provide an increased current upon start up, to aid in striking the arc. When a current is detected, i.e., the arc has been struck, start up circuit 205 has no effect on the operation. However, slope amplifier 207 includes a delay, to allow start up circuit 205 to increase the current for about 0.5 seconds after current has been detected. This helps to ensure the current is not reduced before the arc can be maintained. Also, start up circuit 205 includes a delay to prevent activation of the circuit during momentary arc outages.

The signal provided to slope amplifier 207 from variable slope controller 219 causes the slope (below about 45 volts) on the output V-A curves to be dependent on the current reference, i.e., the user selected current. Generally, the output of slope amplifier 207 is attenuated by variable slope controller 219. At higher currents the output is not attenuated at all, at lower currents the output may be attenuated to zero. In this manner the slope will depend on the user selected current.

Figure 3:
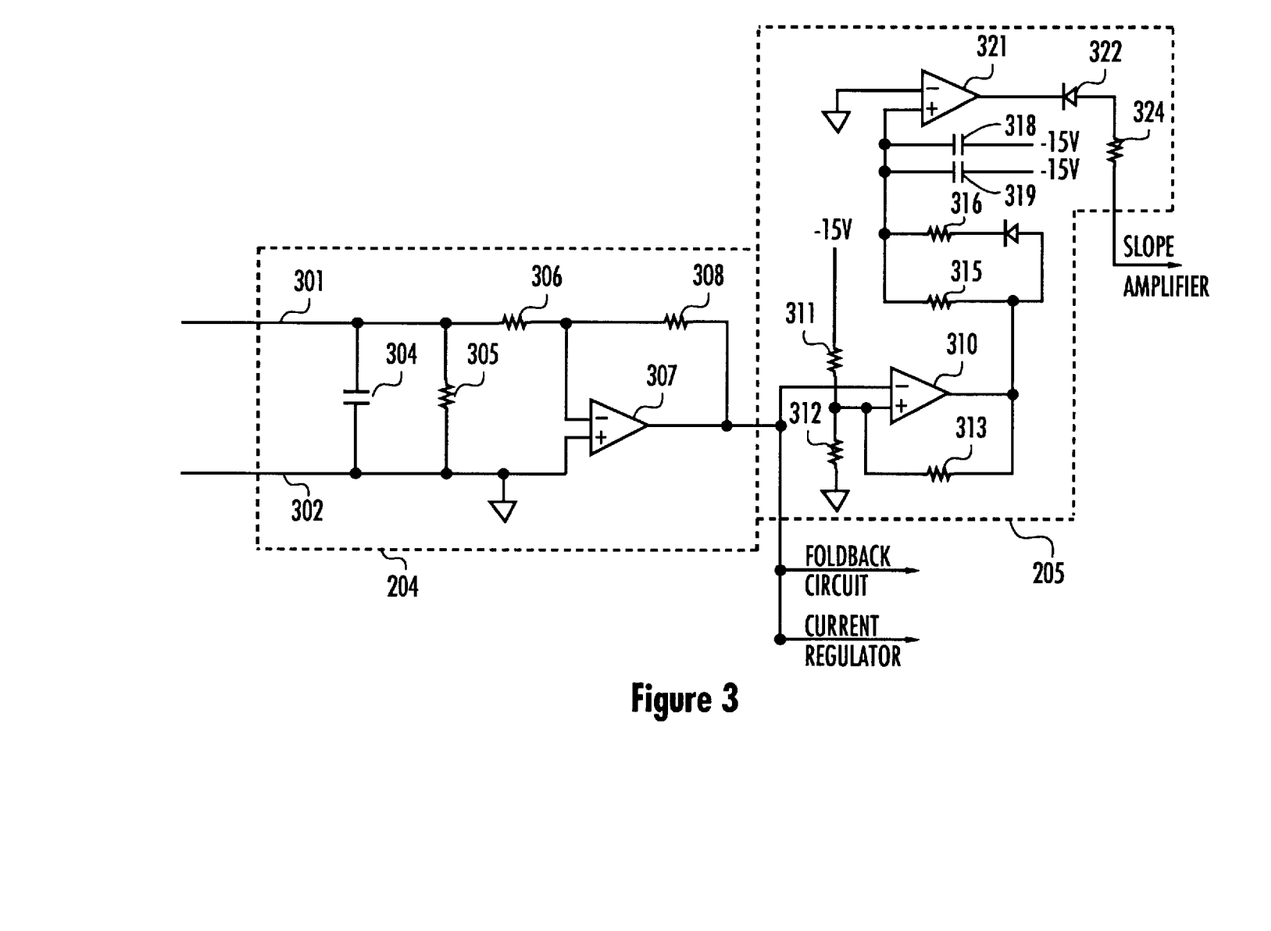
FIG. 3 is a circuit diagram of the current feedback circuit and start circuit shown generally in FIG. 2.

Referring now to FIG. 3, a circuit diagram of current feedback circuit 204 and start circuit 205 is shown. Current feedback circuit 204 to includes input lines 301 and 302, capacitor 304, resistors 305, 306 and 308, and op amp 307.

The input on lines 301 and 302 is provided by a shunt circuit including a separate amplifier isolated from controller 115 in the preferred embodiment. The amplified shunt signal is provided to op amp 307, which has a gain of about one, and scales the current feedback signal for use in other parts of controller 115. In one preferred embodiment capacitor 304 is a 0.1 microfarad capacitor, resistor 305 is a 4.75K ohm resistor, resistor 306 is a 22.1K ohm resistor and resistor 308 is a 26.7K ohm resistor.

As briefly described above, start circuit 205 causes an increased current upon start up to be provided. The input of start circuit 205 is the current feedback signal. Upon start up, that signal will be zero because there is no current. The current feedback signal is fed to a comparator 310 and the other input of comparator 310 is a reference voltage derived from the −15 volt signal by resistors 311 and 312, which is indicative of a selected threshold of current. The output of comparator 310 is fed through a pair of resistors 315 and 316, and a pair of capacitors 318 and 319 to an op amp 321.

At start up, the output of comparator 310 is low and thus the output of op amp 321 is also low. The start circuit is effectively engaged because current may flow through a resistor 324 and a diode 322. When the current feedback increases to the point at which the threshold set by resistors 311 and 312 is crossed, indicating the arc has been struck, the output of comparator 310 goes high, quickly going through a diode D30 and resistor R68 to charge capacitors 318 and 319. When capacitors 318 and 319 are charged, the output of op amp 321 becomes high, diode D29 now blocks, and the start circuit is effectively disengaged from the slope amplifier.

In the preferred embodiment resistor 311 is a 13K ohm resistor, resistor 312 is a 150 ohm resistor, resistor 313 is a 39.2K ohm resistor, resistor 315 is a 1 Meg ohm resistor, resistor 316 is a 68.1K ohm resistor, resistor 324 is a 100K ohm resistor, and capacitors 318 and 319 are 1 microfarad capacitors.

In one alternative embodiment the output of the start circuit may be provided directly to the current regulator. However, the embodiment shown the start circuit is fed through slope amplifier circuit 207, and modified by the variable slope control circuit 219, so that at low selected currents the current surge is not as great, and it is easier for the operator to start because they can see the arc.

Figure 4:
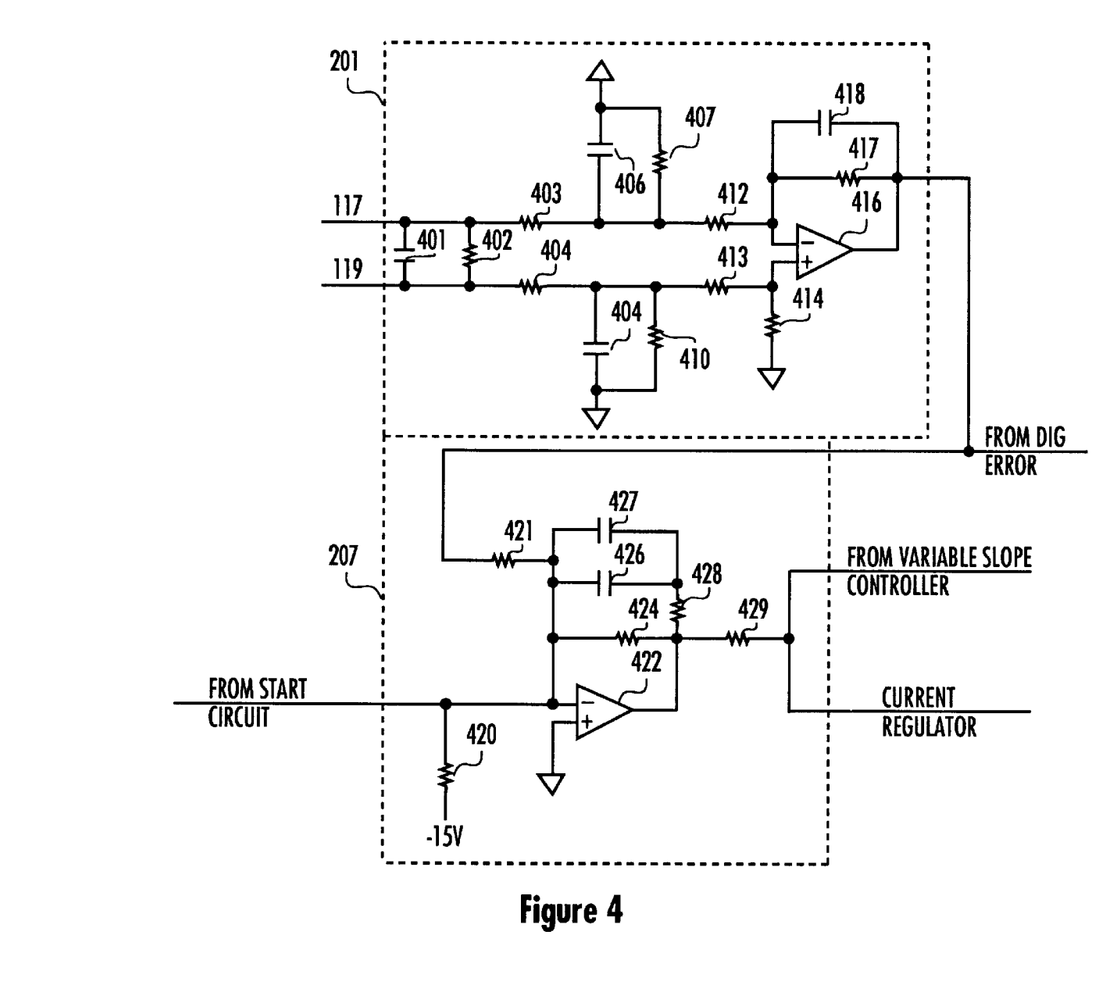
FIG. 4 is a circuit diagram of the voltage feedback circuit and slope amplifier shown generally in FIG. 2.

Referring now to FIG. 4, voltage feedback circuit 201 includes capacitors 401, 406, 409 and 418, resistors 402–404, 407, 410, 412–414 and 417, and op amp 416, and provides a voltage feedback signal indicative of the voltage between the output welding terminals. The voltage of the negative welding output is provided to voltage feedback circuit 201 on line 117, and the voltage of the positive welding output is provided on line 116.

The signals are fed through resistors 402–404, 407, 410, 412 and 413 and capacitors 401, 406 and 409 to the inverting input of op amp 416. The resistors are provided to divide down the output of the welder so that the relatively high welding voltage is not applied into the control circuit. Op amp 416 attenuates the voltage signals, and inverts them.

In one preferred embodiment the attenuation is such that for every one volt at the welding output, 0.1 volts is provided on the output of voltage feedback circuit 201. In that preferred embodiment resistor 402 is a 10K ohm resistor, resistors 403, 404, 412, and 413 are 100K ohm resistors, resistors 407 and 410 are 4.7K ohm resistors, resistors 414 and 417 are 220K ohm resistors.

Slope amplifier 207, also shown on FIG. 4, includes resistors 420, 421, 424, and 428, capacitors 426 and 427, and an op amp 422, to provide a signal indicative of the maximum slope desired, (i.e., the greatest current change for a given voltage change). Slope amplifier 207 receives as an input the output of the voltage feedback circuit 201. The signal is provided to the inverting input of op amplifier 422 through resistor 421, along with a −15 V reference signal (through resistor 420) and the output of start circuit 205. The noninverting input of op amp 422 is tied to ground. The −15 V reference signal sets a reference or a threshold at 45 V, at which the slope amplifier is effective. In other words, at welding output voltages above 45 volts the slope amplifier has no effect.

After the threshold has been crossed, op amp 422 amplifies the feedback signal, so that the output of slope amplifier 207 is inversely proportional to the difference between the welding output voltage and 45V. Thus, the output of op amp 422 is zero above 45 V at the welding output, and ramps down from a maximum of 8 (when the welding output is a short circuit) down to 0 at 45 volts. The 45 V threshold is selected to give a maximum output voltage at lower currents: in other words, it is a constant current output until 45 V, at which point the slope cuts in.

In the preferred embodiment resistor 420 is a 332K ohm resistor, resistor 421 is a 90.9K ohm resistor, resistor 424 is a 200K ohm resistor, resistor 428 is a 100 ohm resistor, resistor 429 is a 15K ohm resistor, capacitor 426 is a 0.68 microfarad capacitor, and capacitor 427 is a one micro farad capacitor.

Figure 5:
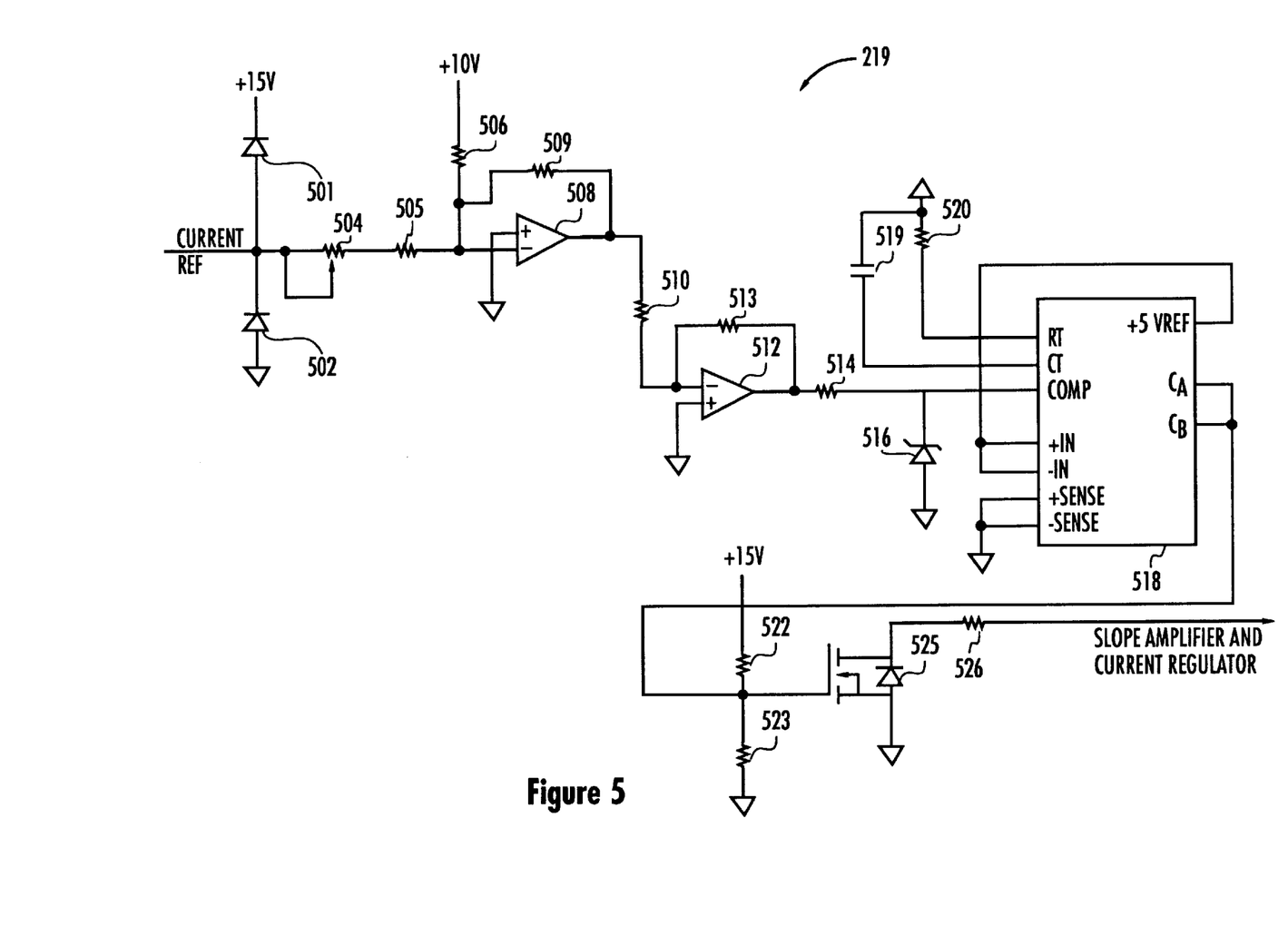
FIG. 5 is a circuit diagram of the variable slope controller shown generally in FIG. 2.

Referring now to FIG. 5, variable slope controller 219 includes diodes 501 and 502, resistors 504, 505, 506, 509, 510, 513, 514, 520, 522, 523 and 526, zener diode 516, PWM chip 518, and MOSFET 525, and attenuates the output of slope amplifier 207, depending upon the user selected current. As is shown on FIG. 4, the output provided by slope amplifier 207 to current regulator 209 is tied to the output of variable slope controller 219.

Generally, at low selected currents the output of slope amplifier 207 is attenuated to zero, and at high currents it is not attenuated at all. Thus, variable slope controller 219 varies the output of slope amplifier 207, depending upon the user selected current (set by a potentiometer on the front of the machine).

More specifically, the input to variable slope controller 219 is the current reference signal, which is the output of the current selecting potentiometer on the front panel of the machine. The current reference signal is fed past diodes 501 and 502 through resistor 504, which sets the maximum slope point. Resistor 504 is selected to determine the user selected current above which the output of slope amplifier 207 is not attenuated at all. In the preferred embodiment this is approximately 100 amps.

When the user has selected minimum current, the variable slope controller varies the output of the slope amplifier down to 0, effectively short circuiting that output. As the user would adjust the potentiometer on the front of the machine for higher current, the variable slope controller allows greater slope until a maximum established by resistor 504. Above the point established by resistor 504, the variable slope controller has no effect.

PWM chip 518 is used such that when the output of PWM chip (on outputs Ca and Cb) is high, MOSFET 525 is turned on. This shorts the output of slope amplifier 207, through resistor 526 and MOSFET 525, to ground. Conversely, when the output of PWM chip 518 is low, MOSFET 525 is turned off, and the output of slope amplifier 207 is connected directly to current regulator 209. Thus, the percentage of high versus low on the output of PWM chip 518 controls the attenuation of the output of slope amplifier 207.

The circuitry leading from the current reference signal to the comp input of PWM chip 518, including op amps 508 and 512, scale the current reference signal to match the internal generated ramp of the comp input of PWM chip 518, such that at high selected current (above 100 amps), the output of PWM is 100% low, causing the slope amplifier to be 100% (i.e., not attenuated at all). Also, the scaling is such that at the minimum selected current, the output of PWM chip 518 is 100 high, causing the output of slope amplifier 207 to be completely shorted. The effect is linear between the two extremes.

In the preferred embodiment resistor 504 is a variable resistor having a maximum resistance of 10K ohms, resistors 505, 509, 520, are 10K ohm resistors, resistor 506 is a 30K ohm resistor, resistor 510, 513 are 100K ohm resistors, resistor 514 is a 3.32K ohm resistor, resistors 522 and 523 are 33.2K ohm resistors and resistor 526 is an 8.25K ohm resistor.

Figure 6:
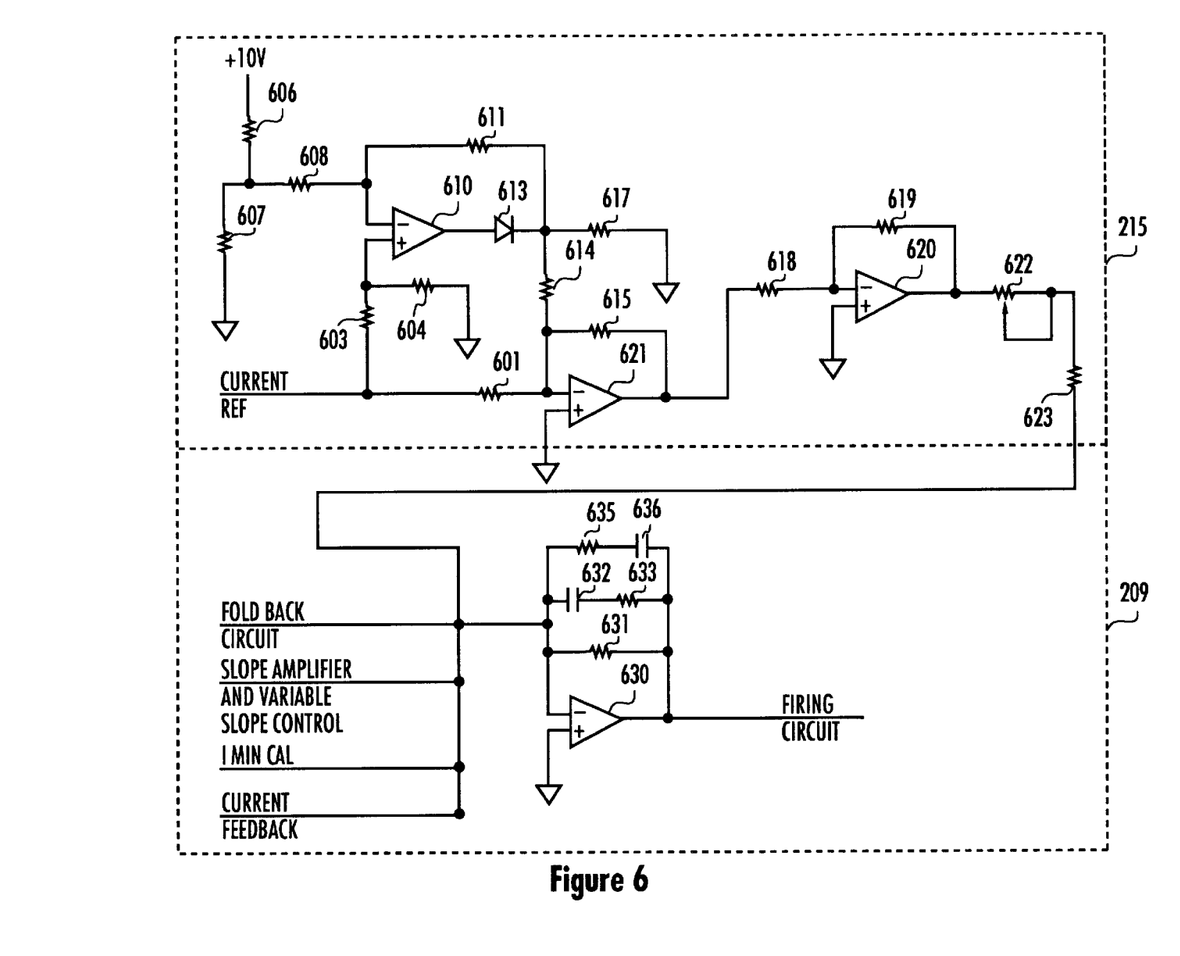
FIG. 6 is a circuit diagram of the linearizing circuit and current regulator shown generally in FIG. 2.

Referring now to FIG. 6, linearizing circuit 215 includes resistors 601, 603, 604, 606, 607, 608, 611, 614, 615, 617, 618, 622 and 623, diode 613, and op amps 610, 621 and 620, and it linearizes the selected current signal (current reference) so that a current range from the minimum current to about 80 amps is obtained by adjusting the potentiometer on the machine front panel from zero to about 25–30 degrees. In other words, without the linearizing circuit a very small mechanical rotation of the current potentiometer on the front panel would cause large swing in the current output.

In the preferred embodiment resistor 601 is a 200K ohm resistor, resistors 603, 604, 608, 611, 615, 618 and 619 are 100k ohm resistors, resistors 606 and 623 are 6.81K ohm resistors, resistor 607 is a 3.32K ohm resistor, resistor 614 is a 130K ohm resistor, resistor 617 is a 4.75K ohm resistor, and resistor 622 is a 10K variable resistor having a maximum resistance of 10K.

Current regulator 209, also shown on FIG. 6, includes an op amp 630, resistors 631, 633 and 635, and capacitors 632 and 636, and provides an output to firing circuit 221, in a manner well known in the art.

The current feedback is provided to current regulator 209 through a 1K ohm resistor and a 3.92K ohm resistor (not shown) to op amp 630. Along with the current feedback signal, a dig error signal is provided through a 22.1K ohm resistor (not shown). Current regulator 209 also includes an input from slope amplifier 207 and variable slope controller 219 as described above.

The dig error signal is similar to the output of slope amplifier 207 in that it is inversely proportional to the voltage feedback signal similar. This provides the dig or foot in the output V-A curve, which was described above. Just as slope amplifier 207 has a cut in voltage (45 volts), the dig error cut in (breakpoint) is set for about 18 or 19 volts, in the preferred embodiment. In other words, above about 18 V, the dig error has no effect. Below about 18 volts it increases the slope of the V-A curve (provides a greater current decrease for a given voltage increase). In the preferred embodiment the user may adjust the dig slope from having no effect whatsoever to having a maximum effect.

In the preferred embodiment the components associated with op amp 630 provide the appropriate scaling and phase shifting. Resistor 631 is a 1 Meg ohm resistor, resistor 633 is a 18.2K ohm resistor, capacitor 632 is a 0.22 microfarad capacitor, resistor 635 is a 68.1K ohm resistor and capacitor 636 is a 0.68 microfarad capacitor.

Accordingly, a controller has been described that provides output V-A curves having multiple breakpoints, including an adjustable dig, a varying slope over a usable welding range, a delay in the adjusting of the current in response to arc voltage changes. As one skilled in the art other control features may be implemented using the present invention.

Thus, it should be apparent that there has been provided in accordance with the present invention a power supply that fully satisfies the objectives and advantages set forth above. Although the invention has been described in conjunction with specific embodiments thereof, it is evident that many alternatives, modifications, and variations will be apparent to those skilled in the art. Accordingly, it is intended to embrace all such alternatives, modifications, and variations that fall within the spirit and broad scope of the appended claims.

The embodiments of the invention in which an exclusive property or privilege is claimed are defined as follows:

1. An engine driven welding power supply for providing a welding output having a plurality of volt ampere curves, each of the curves being associated with a selected current output, comprising:

an ac generator capable of providing an ac signal;

rectifier means for receiving the ac signal and providing a chopped dc signal;

output inductor means for receiving the chopped dc signal and providing a smoothed dc output, controller means, connected to the rectifier means, for providing each welding volt ampere curve a slope over a usable arc welding range, wherein the slope is associated with the selected current, and wherein the magnitude of the slope is dependent on the selected current output, and the slope varies for output currents at least under 100 amps.

2. The apparatus of claim 1, wherein the rectifier means includes a bridge comprised of at least four switches.

3. The apparatus of claim 2 wherein the at least four switches are SCRs.

4. The apparatus of claim 1 wherein the controller means provides a plurality of slopes for each volt-ampere curve over the entire output range, wherein each curve has at least two breakpoints.

5. The apparatus of claim 1 wherein the controller means provides the slopes such that the magnitude is less steep for greater selected current outputs.

6. An engine driven welding power supply for providing a welding output having a plurality of volt ampere curves, each of the curves being associated with a selected current output, comprising:

an ac generator capable of providing an ac signal;

a phase controlled rectifier, connected to receive the ac signal, and having a control input, wherein a chopped dc signal is provided in response to the ac signal and the control input;

an output inductor, connected to receive the chopped dc signal, and capable of providing the welding output, wherein the each curve has a slope responsive to the control input; and a controller, including a feedback input indicative of the welding output, and means for providing control signal such that each curve has a welding slope over a usable arc welding range, and each slope is associated with the selected current wherein the welding slope of each curve is responsive to the selected current output and varies for currents under at least 100 amps.

7. The apparatus of claim 6, wherein the phase controlled rectifier includes a bridge comprised of at least four switches.

8. The apparatus of claim 7 wherein the at least four switches are SCRs.

9. The apparatus of claim 6 wherein the means for providing control signals further provides control signals such that each volt-ampere curve has at least two breakpoints.

10. The apparatus of claim 6 wherein the plurality of curves includes a first curve associated with a lesser welding current and a second curve associated with a greater welding current, wherein the welding slope of the first curve is steeper than the welding slope of the second curve.

11. The apparatus of claim 10 wherein the welding slope increases as the selected welding current increases.

12. A method of supplying a welding output having a plurality of volt ampere curves, each of the curves being associated with a selected current output, comprising:

generating an ac signal;

rectifying the ac signal and providing a chopped dc signal;

smoothing the chopped dc signal to provide a dc output, creating a slope for each of the curves, wherein the slope is for arc welding and is associated with and dependent on the selected current output and varies for currents under at least 100 amps.

13. The method of claim 12 including the step of creating at least two breakpoints for each curve.

14. The method of claim 12 including the step of decreasing the steepness of the slope of each curve as the selected welding current increases.

* * * * *